June 26, 1934.  J. L. SPENCE, JR  1,964,370
FILM FEED MECHANISM
Filed Dec. 28, 1929   2 Sheets-Sheet 1
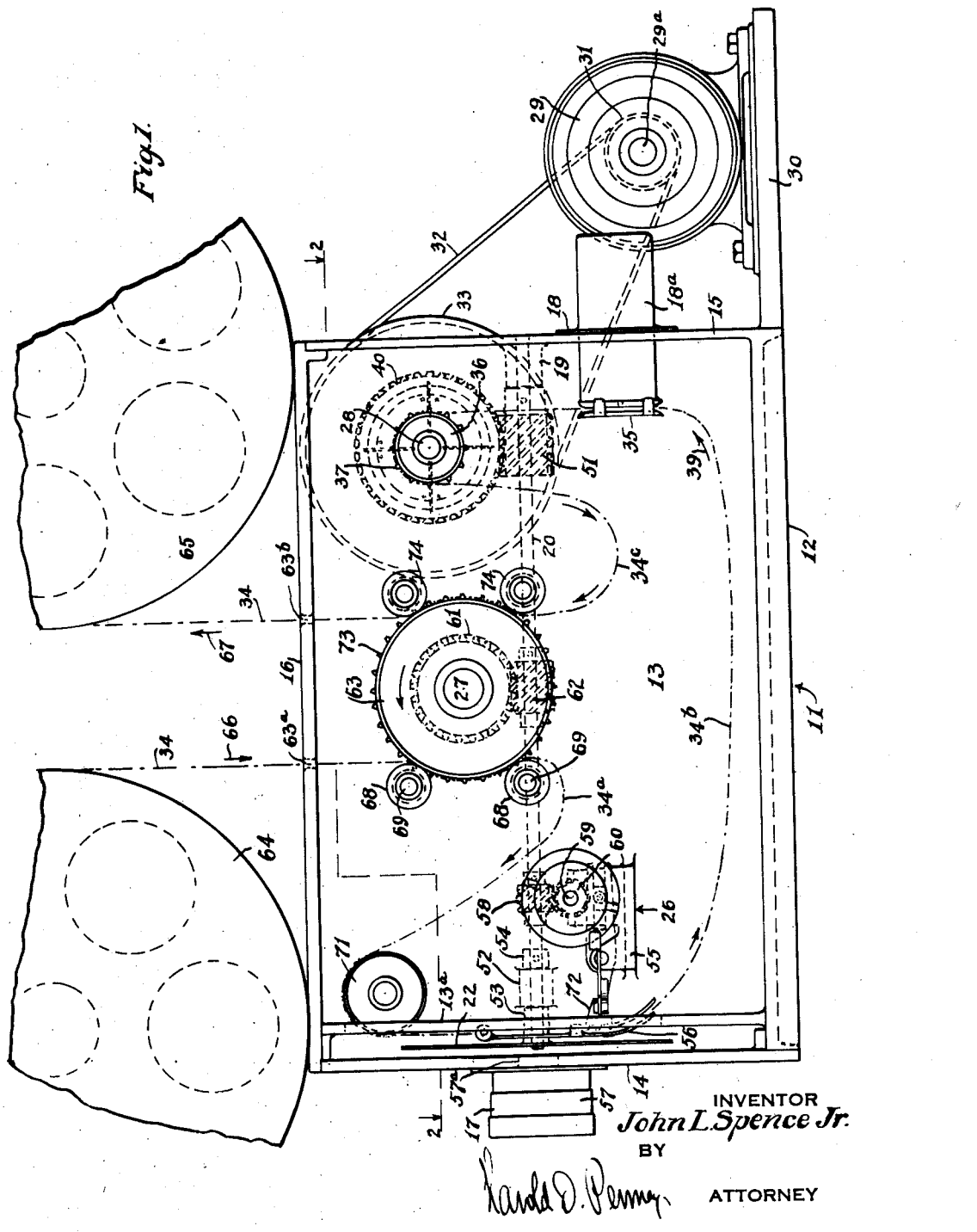
INVENTOR
*John L. Spence Jr.*
BY
*Harold O. Penney*
ATTORNEY

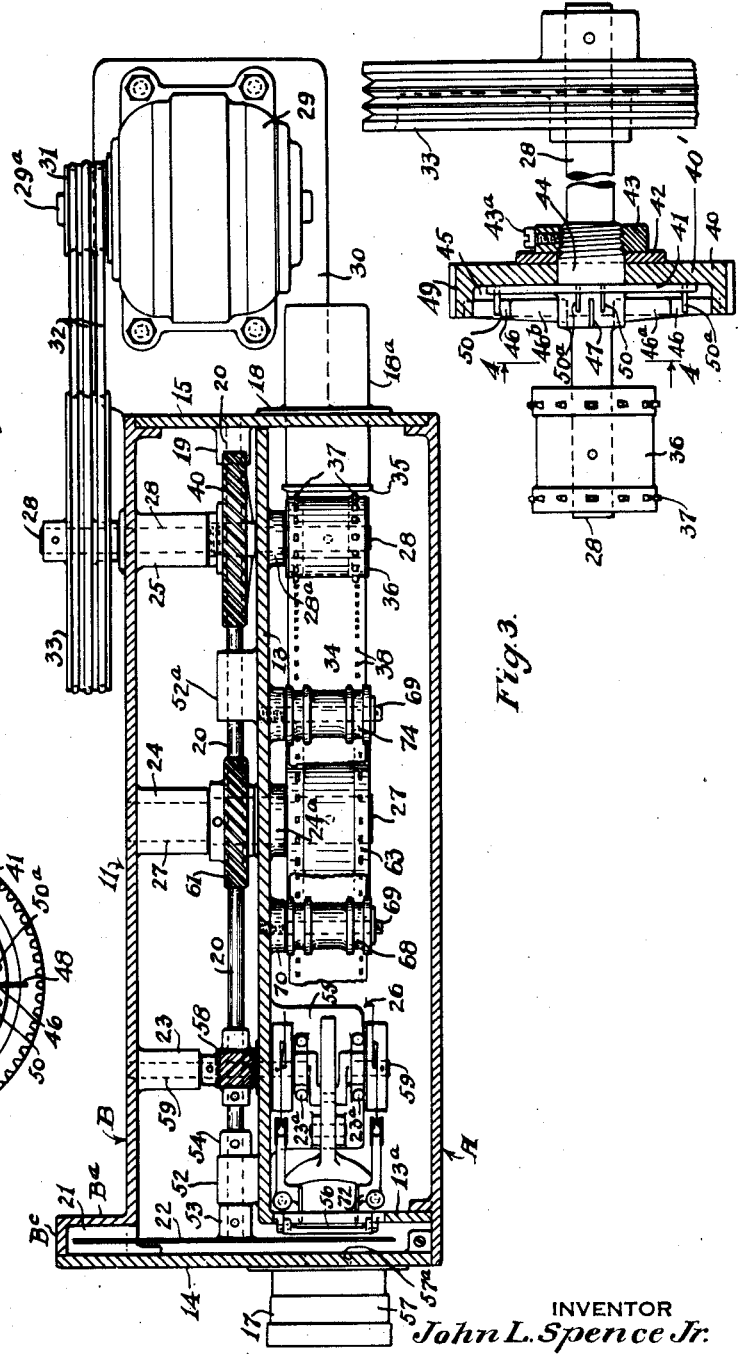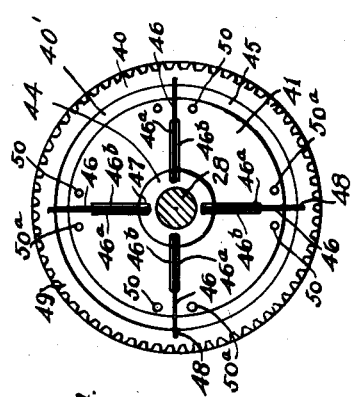

Patented June 26, 1934

1,964,370

UNITED STATES PATENT OFFICE 1,964,370

FILM FEED MECHANISM

John L. Spence, Jr., New York, N. Y., assignor, by mesne assignments, to Remac Patents Corporation, New York, N. Y., a corporation of New York Application December 28, 1929, Serial No. 417,096

3 Claims. (Cl. 88—16.2)

This invention relates to improvements in a film feed mechanism for sound recording motion picture machines and in connection with cameras forming part of said machines. It has for one of its objects the provision of a resilient uniform velocity film feed mechanism, for moving a film through or before the gate of a sound recording device at a uniform velocity, which when combined with a camera corresponds to the average speed of the intermittent motion of another part of the film at the photographic aperture, without the usual loss of uniformity of motion, as is the case in machines of this type at present, which loss is due to the method of feeding the film and the back lash or inaccuracy of the gear teeth of the mechanism.

Another object of my invention is to provide a perfected film feed mechanism, whereby to secure substantial synchronism between the action of the sound recording apparatus and that of the photographic apparatus and have all corresponding parts of the records of said apparatuses spaced a uniform distance from each other on the film, whereby the presentation of said records may also be synchronous in all of its parts.

A further object of my invention is to have my film feed mechanism effective, simple, durable and comparatively inexpensive.

Other objects and advantages will hereinafter appear.

I attain these objects by the film feed mechanism, one form of which is illustrated in the accompanying drawings or by any mechanical equivalent or obvious modification of the same.

In the drawings,

Fig. 1 is a fragmentary side elevation of my film drive mechanism as viewed from the right end side of the machine with the door of the camera casing removed, showing the film by a broken line;

Fig. 2 is a sectional top plan view of my film feed mechanism on the line 2—2 of Fig. 1;

Fig. 3 is an enlarged fragmentary detail view in rear elevation, showing the driving shaft and the parts connected thereto, including the resiliently driven gear thereon, which is hereinafter described, the latter being shown in section;

Fig. 4 is a detail view in elevation of the said gear and the resilient driving means and other parts associated therewith, as hereinafter described, on the line 4—4 of Fig. 3.

Like reference characters refer to like parts throughout the several views.

11 designates a camera housing, which is shown in Figs. 1 and 2 as comprising a base 12, an interior vertically disposed angular partition wall 13—13a, which is integral with said base 12, detachable side walls A and B, a front wall 14, a rear wall 15 and a cover 16, which is mounted on all of said walls.

The camera housing 11 encloses a film photography apparatus, including a reciprocating intermittent film feed mechanism 26 and a standard type of known sound recording apparatus, enclosed by a suitable cover 18a. Said mechanism 26 may be similar to the one described in my co-pending application for patent for Film feed for moving picture cameras, filed Oct. 19, 1929, Serial No. 400,827.

The front wall 14 has thereon a hood 17, enclosing a photographic lens of usual design; and the rear wall 15 has thereon a flange 18, supporting said condensing lens tube 18a, enclosing sound recording element, which may be of any standard design; said wall 15 also has thereon a bearing boss 19 interiorly of said housing 11, for rotatably supporting one end of a gear shaft 20, which is hereinafter more fully described.

The side wall A of said housing 11 is held in place on the latter by a suitable lock and may be readily detached therefrom for reloading purposes.

The side wall B has thereon at the front end thereof an angular part $B^a$, $B^c$, which forms with said wall 14 a clearance recess 21, for enclosing a portion of a shutter 22, which extends thereinto, as shown in Fig. 2.

The side wall B is also provided with bearing bosses 23, 24 and 25, for rotatably supporting therein the shafts 59, 27 and 28 respectively, which are shown in Fig. 2 and are hereinafter more fully described.

A motor 29 is shown in Figs. 1 and 2 as secured to a shaft 29a, which is mounted on a platform 30, which extends rearwardly from said base 12; said motor 29 serves to drive the mechanisms enclosed by said camera housing 11.

Said shaft 29a has secured thereto at one end thereof a multi-grooved pulley 31, which is in engagement with a set of noiseless drive-belts 32, which are made preferably of rubber and are in engagement with a multi-grooved drum or flywheel 33, of a larger diameter than said pulley 31; said fly-wheel 33 is secured to the outer end of a driving shaft 28.

Said drum or fly-wheel 33 and said shaft 28 have a substantially uniform velocity maintained therein by said motor 29.

In machines of this type, which include devices having an intermittent motion, there is frequently a tendency to produce a marked variation in the velocity of the driving mechanism through the variable resistance of the intermittently operating mechanism; in a camera of this class a part 34b of a film 34 must be moved through a gate 35 of a sound recording apparatus synchronously with and at the same average linear velocity in feet per second as another part 34a of said film 34 is being intermittently moved by the reciprocating mechanism 26 through a suitable photographic apparatus; it is also of vital importance that a perfectly uniform velocity of feed of said part 34b of said film 34 shall be maintained, while it is being drawn through said gate 35 of the sound recording apparatus at 18a.

For this purpose I have provided the herein described driving mechanism, which is designed to offset the mechanical difficulties, which have been hitherto encountered.

The driving shaft 28 has secured thereto at the inner end thereof a uniform velocity film feed sprocket 36 of a suitable diameter, which has thereon teeth 37, for engaging perforations 38 in the part 34b of said film 34, while the camera is in operation, and to draw said part of said film at a uniform velocity in the direction of the arrow 39, as shown in Fig. 1, through the gate 35 of said sound recording apparatus at 18a.

The shaft 28 has also secured thereto at an intermediate part thereof a spiral-toothed main driving gear 40, having a web portion 40' which is shown in Fig. 3 as yieldably held between a flange or disc 41, and a plate or washer 42, which is frictionally held against the flat side of said gear web 40' by means of a nut 43 and a set screw 43a; said nut 43 is threadedly connected to one end of an enlarged part or hub 44 on said shaft 28; by means of said nut 43 and set screw 43a the frictional position of said plate 42 against the side of said gear web 40' may be maintained constant, thereby preventing the displacement of said gear web 40' lengthwise of said shaft 28 and at the same time by adjusting nut 43 various degrees of friction may be set up between 41 and gear 40 thereby producing a snubbing action on the movement of the gear web 40'. The disc 41, which is integral with or rigidly attached to the hub 44, is disposed in the recess 45 of said driving gear.

Said recess 45, has housed therein a set of laminated leaf springs or arms, which include outer members 46a, 46b shown in Figs. 3 and 4 and are engaged at their inner ends in slots 47, which are provided in said part 44 of said shaft 28, and at the outer ends thereof members 46 of said arms could be slidably positioned in slots 48, which are provided in the inner side of the rim 49 of said gear 40; but in the present instance the latter arms are held in the slots 48, as shown. The springs 46a, 46b may have their inner ends welded to said part 44; and these springs or arms allow the angular velocity of said gear 40 to vary with relation to the angular velocity of said shaft 28, for a purpose, which is hereinafter described.

Said flange or disc 41 has secured thereto near the outer periphery thereof two sets of motion limiting pins 50, 50a, positioned one on each side of each of said leaf springs 46, to prevent excessive deviation of said gear 40 in either direction from its normal position on said part 44 of said shaft 28.

Said gear 40 is in mesh with a spiral gear 51, which is secured to the rear end of said shaft 20, as shown in dotted lines in Fig. 1; said shaft 20 is rotatably supported by means of bearings 52 and 52a, which are integral with the part 13 of said wall 13—13a, and said bearing boss 19, which is integral with said wall 15, as hereinbefore described.

Said shaft 20 has secured thereto at the forward end thereof the hub 53 of said shutter 22; said hub 53 is abutting at the rear end thereof against the front end of the front shaft bearing 52. A thrust collar 54 is secured to said shaft 20 rearwardly of said bearing 52, to prevent displacement of said shaft 20 lengthwise thereof.

The intermittent film feed device 26 is shown in Figs. 1 and 2 as located in the front part of said housing 11 and supported by a bracket 55, which is integral with said part 13 of the wall 13—13a.

The device 26 intermittently draws a part 34a of the film 34 downwardly through the gate 56 of a photographic apparatus 57 rearwardly of a lens aperture 57a therein; said device 26 is driven by a gear 60, which is secured to a shaft 59, which is rotatably supported by the bearings 23 and 23a, and is in mesh with a gear 58, which is secured to said shaft 20 near the front end thereof.

Said shaft 20 has also secured thereto at an intermediate part thereof a gear 62, which is in mesh with a gear 61 on said shaft 27, which is rotatably supported by the bearings 24 and 24a and has secured thereto a relatively large film feed sprocket 63 to feed the film 34 at one part thereof from a drum 64, located on the top of the camera 11 near the front thereof, into the camera 11 through a slot 63a in the top thereof and to feed the film 34 at another part thereof out of the camera 11 through a slot 63b in the top thereof on to a drum 65, which is located on the top of said camera 11 near the rear thereof.

The film drums 64 and 65 are rotatably supported within a light proof box not shown in which on said camera 11 are fragmentarily shown in Fig. 1, in which the film 34 is indicated by dot and dash lines, and the directions of travel of parts thereof onto and off said sprocket 63 are indicated by the arrows 66 and 67 respectively.

The film 34, after passing into the camera 11, is held against part of the periphery of said sprocket 63 by means of a pair of guide rolls 68, which are rotatably supported by stud pins 69, which are threaded into bosses 70, which are integral with said part 13 of the wall 13—13a; the film 34 then extends downwardly from said sprocket 63, to form a loop as at 34a and is then carried over a guide roll 71, located in the front part of the camera 11, as shown in Fig. 1, and is then drawn downwardly through said gate 56 by means of claw teeth 72 on the mechanism 26, to form another lop 34b, which extends across the lower part of the camera 11 to the gate 35 of the sound recording apparatus enclosed by the tube 18a.

During the operation of the camera 11 the length of said loop 34b alternately increases and decreases as the film 34 is being drawn upwardly through the said gate 35 by means of the sprocket 36 on said shaft 28, which has a constant velocity maintained therein by said fly-wheel 33.

After passing over said sprocket 36 the film 34 forms a loop 34c, which extends to said sprocket 63 and is held in engagement with the teeth 73 of the latter by means of a pair of guide rolls 74; thereupon the film 34 is fed upwardly through an aperture 63b out of the camera 11 to said drum 65.

The resistance exerted by said gear 59 on said gear 58 is not uniform, but varies from a maximum during one part of the revolution of said shaft 60 to a minimum during another part of the revolution thereof.

This variation in the resistance or load is transmitted by said shaft 20 to said gear 51, which is in mesh with said gear 40; and the latter is kept in its normal position on said shaft 28 by means of the said leaf springs. Whenever the said load exceeds the average, the gear 40 is turned backwardly with relation to said shaft 28 against the resistance of said leaf spring, which are deflected thereby, until the resistance of said springs becomes sufficiently great to arrest the said backward relative motion of said gear 40 on said shaft 28 or until said springs 46 are intercepted by one of said sets of pins 50—50a on said disc 41.

Thereupon when the load or force, exerted by said gear 51 on said gear 40, falls below that corresponding to the deflection of said leaf springs 46, 46a, the latter turn said gear web or plate 40' with its rim in the opposite direction or forwardly until, during the interval of low load and aided by the momentum of said gear web with its rim, the latter is brought back to its normal position on the hub or near it. The resistance of said leaf springs to deflection in the opposite direction opposes forward over travel of said gear web 40' on said shaft hub 44, and the forward overtravel is limited by the other set of said stops 50a.

Laminations 46a and 46b are provided on opposite sides of said springs 46 to reinforce the same under a load and to limit the deflection thereof.

Variations are possible and parts of my invention may be used without other parts.

I do not, therefore, restrict myself to the details as shown in the drawings; but I intend to include also all mechanical equivalents and obvious modifications of the same within the scope of my invention.

I claim as my invention and desire to secure by Letters Patent:

1. In combination, a main drive shaft of uniform speed; constant feed means driven thereby for driving one portion of a film at uniform speed; a sound device associated with said portion; additional film drive means for conducting film to and from said constant means and intermittently driving a second portion of the film; picture-forming means associated with said second portion; and means by which said additional means is driven from said shaft, comprising a member rotary with said shaft; and friction means interposed between said member and shaft and allowing several degrees of relative motion therebetween.

2. In combination, a main drive shaft of uniform speed; constant feed means driven thereby for driving one portion of a film at uniform speed; a sound device associated with said portion; additional film drive means for conducting film to and from said constant means and intermittently driving a second portion of the film; picture forming means associated with said second portion; and means driving said additional means from said shaft comprising a member rotary with said shaft; a yieldable connection between said member and shaft for holding them in a normal relative relation and allowing several degrees of relative motion therebetween of each side of said relation; means for limiting said relative motion; and friction means interposed between said member and shaft to add to the rotary force of the yieldable connection and to prevent hunting by the yieldable connection.

3. In combination, a main drive shaft; constant feed means driven thereby for driving a portion of a film at uniform speed; additional film drive means for conducting film to and from said constant means and intermittently driving a second portion of a film; and means driving said additional means from said shaft comprising a member rotary with said shaft; a yieldable connection between said member and shaft for holding them in a normal relative relation and allowing several degrees of relative motion therebetween of each side of said relation; means for limiting said relative motion; and friction means interposed between said member and shaft to add to the rotary force of the yieldable connection and to prevent hunting by the yieldable connection.

JOHN L. SPENCE, JR.